US011216173B2

(12) United States Patent
Ewe

(10) Patent No.: US 11,216,173 B2
(45) Date of Patent: *Jan. 4, 2022

(54) DYNAMIC EXECUTION ENVIRONMENT IN NETWORK COMMUNICATIONS

(71) Applicant: SYNACTIVE, INC., Foster City, CA (US)

(72) Inventor: Thomas Ewe, San Francisco, CA (US)

(73) Assignee: SYNACTIVE, INC., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,107

(22) Filed: Mar. 22, 2019

(65) Prior Publication Data

US 2019/0286294 A1 Sep. 19, 2019

Related U.S. Application Data

(63) Continuation of application No. 15/081,674, filed on Mar. 25, 2016, now abandoned, which is a
(Continued)

(51) Int. Cl.
*G06F 15/16* (2006.01)
*G06F 3/0486* (2013.01)
(Continued)

(52) U.S. Cl.
CPC ............ *G06F 3/0486* (2013.01); *G06F 9/451* (2018.02); *H04L 43/045* (2013.01); *H04L 67/2804* (2013.01)

(58) Field of Classification Search
CPC ..... G06F 3/0486; G06F 9/451; H04L 43/045; H04L 67/2804
See application file for complete search history.

(56) References Cited

U.S. PATENT DOCUMENTS 6,058,375 A   5/2000  Park
6,108,309 A   8/2000  Cohoe et al.
(Continued)

FOREIGN PATENT DOCUMENTS

KR  1020010043107 A   5/2001
KR  1020080024617 A   3/2008
(Continued)

OTHER PUBLICATIONS

Communication pursuant to Article 94(3) EPC dated Nov. 21, 2016 for related European Patent Application No. 13822813.5, in 10 pages.
(Continued)

*Primary Examiner* — Cheikh T Ndiaye
(74) *Attorney, Agent, or Firm* — Procopio, Cory, Hargreaves & Savitch LLP

(57) ABSTRACT

A computer-implemented system and method for providing a dynamic execution environment. In an embodiment, the system and method comprises receiving a base user interface from a server, creating and storing one or more intermediate representations (IRs) which represent a mapping between the base user interface and a modified user interface, executing the one or more IRs to intercept network communication from the server, map between the base user interface and the modified user interface, and send the modified user interface to one or more clients, and executing the one or more IRs to intercept network communication from the one or more clients to the server with user data, map between the modified user interface and the base user interface, and send the base user interface and the user data to the server.

19 Claims, 9 Drawing Sheets

Related U.S. Application Data continuation of application No. 13/560,204, filed on Jul. 27, 2012, now Pat. No. 9,300,745.

(51) Int. Cl.
  *G06F 9/451* (2018.01)
  *H04L 29/08* (2006.01)
  *H04L 12/26* (2006.01)

(56) References Cited

U.S. PATENT DOCUMENTS

| | | |
|---|---|---|
| 6,397,220 B1 | 5/2002 | Deisinger et al. |
| 6,760,745 B1 | 7/2004 | Tan et al. |
| 6,822,663 B2 | 11/2004 | Wang et al. |
| 6,970,823 B1 | 11/2005 | Yago et al. |
| 6,993,712 B2 | 1/2006 | Ramachandran et al. |
| 7,093,195 B2 | 8/2006 | Lynch et al. |
| 7,137,127 B2 | 11/2006 | Slotznick |
| 7,151,438 B1 | 12/2006 | Hall et al. |
| 7,234,111 B2 | 6/2007 | Chu et al. |
| 7,278,110 B1 | 10/2007 | Wugofski |
| 7,386,485 B1 | 6/2008 | Mussman et al. |
| 7,480,867 B1 | 1/2009 | Racine et al. |
| 7,493,591 B2 | 2/2009 | Charisius et al. |
| 7,565,381 B2 | 7/2009 | Oswalt |
| 7,568,167 B2 | 7/2009 | Van Dok et al. |
| 7,577,601 B1 | 8/2009 | Rademacher et al. |
| 7,752,299 B2 | 7/2010 | Bookman et al. |
| 7,792,784 B2 | 9/2010 | Gupta |
| 7,805,523 B2 | 9/2010 | Mitchell et al. |
| 7,809,600 B1 | 10/2010 | Como et al. |
| 7,899,763 B2 | 3/2011 | Machulsky et al. |
| 7,970,943 B2 | 6/2011 | Lin et al. |
| 8,010,605 B2 | 8/2011 | Chang |
| 8,078,731 B1 | 12/2011 | Bruder et al. |
| 8,166,130 B2 | 4/2012 | Reinart |
| 8,201,143 B2 | 6/2012 | Reamey |
| 8,214,409 B2 | 7/2012 | O'Farrell et al. |
| 8,271,031 B2 | 9/2012 | Boskovic |
| 8,306,862 B2 | 11/2012 | Weiler et al. |
| 8,365,144 B1 | 1/2013 | Webb |
| 8,370,751 B2* | 2/2013 | Graeff ........................ G06F 8/38 715/744 |
| 8,429,286 B2 | 4/2013 | Pantos |
| 8,990,427 B2 | 3/2015 | Ewe et al. |
| 9,069,627 B2 | 6/2015 | Ewe |
| 9,225,804 B2 | 12/2015 | Ewe et al. |
| 9,420,054 B2 | 8/2016 | Ewe et al. |
| 9,661,096 B2 | 5/2017 | Ewe et al. |
| 2002/0083154 A1 | 6/2002 | Auffray et al. |
| 2002/0120679 A1* | 8/2002 | Hayton ..................... G06F 8/38 709/203 |
| 2003/0014496 A1 | 1/2003 | Spencer et al. |
| 2003/0060896 A9 | 3/2003 | Hulai et al. |
| 2003/0193521 A1 | 10/2003 | Chen et al. |
| 2003/0231750 A1 | 12/2003 | Janveja et al. |
| 2004/0109011 A1 | 6/2004 | Peterson, Jr. |
| 2004/0163046 A1 | 8/2004 | Chu et al. |
| 2005/0005259 A1 | 1/2005 | Avery et al. |
| 2006/0041618 A1 | 2/2006 | Chang |
| 2006/0212846 A1 | 9/2006 | O'Farrell et al. |
| 2006/0265662 A1 | 11/2006 | Gertzen |
| 2007/0094597 A1 | 4/2007 | Rostom |
| 2007/0112958 A1 | 5/2007 | Kim |
| 2007/0124670 A1 | 5/2007 | Finck et al. |
| 2007/0150820 A1 | 6/2007 | Salvo |
| 2007/0180386 A1 | 8/2007 | Ballard et al. |
| 2007/0220527 A1 | 9/2007 | Tolgu et al. |
| 2007/0234235 A1 | 10/2007 | Scott |
| 2007/0238488 A1 | 10/2007 | Scott |
| 2007/0238489 A1 | 10/2007 | Scott |
| 2007/0256003 A1 | 11/2007 | Wagoner et al. |
| 2008/0040653 A1 | 2/2008 | Levine |
| 2008/0072239 A1 | 3/2008 | Liang et al. |
| 2008/0127060 A1* | 5/2008 | Reamey .................. G06F 9/542 717/106 |
| 2008/0178073 A1 | 7/2008 | Gao et al. |
| 2009/0013267 A1 | 1/2009 | Cudich et al. |
| 2009/0013281 A1 | 1/2009 | Helfman et al. |
| 2009/0063988 A1 | 3/2009 | Graeff et al. |
| 2009/0083643 A1 | 3/2009 | Beringer |
| 2009/0158147 A1* | 6/2009 | Amacker ............ G06F 3/03543 715/700 |
| 2009/0204583 A1 | 8/2009 | Hechler et al. |
| 2009/0228490 A1 | 9/2009 | Faenger |
| 2009/0318126 A1 | 12/2009 | Schimitzek |
| 2010/0005053 A1 | 1/2010 | Estes |
| 2010/0005098 A1 | 1/2010 | Millmore et al. |
| 2010/0037237 A1 | 2/2010 | Reinart |
| 2010/0049874 A1 | 2/2010 | Chene et al. |
| 2010/0064230 A1* | 3/2010 | Klawitter ................ G06F 9/452 715/748 |
| 2010/0100823 A1 | 4/2010 | Ewe et al. |
| 2010/0153866 A1 | 6/2010 | Sharoni |
| 2010/0163046 A1 | 7/2010 | Fisher et al. |
| 2010/0205530 A1 | 8/2010 | Butin et al. |
| 2011/0087179 A2 | 4/2011 | Blott et al. |
| 2011/0111742 A1 | 5/2011 | Neil et al. |
| 2011/0159916 A1 | 6/2011 | Boskovic |
| 2011/0252147 A1 | 10/2011 | Ewe et al. |
| 2011/0307630 A1 | 12/2011 | Lange et al. |
| 2012/0027269 A1 | 2/2012 | Fidaleo et al. |
| 2012/0110209 A1 | 5/2012 | Bonefas et al. |
| 2012/0137233 A1 | 5/2012 | Lewontin |
| 2012/0174121 A1 | 7/2012 | Treat et al. |
| 2012/0229499 A1 | 9/2012 | Tsao et al. |
| 2012/0266068 A1 | 10/2012 | Ryman et al. |
| 2013/0041980 A1 | 2/2013 | Wickman |
| 2013/0060845 A1 | 3/2013 | Chalana et al. |
| 2013/0097095 A1 | 4/2013 | Rumig et al. |
| 2013/0103391 A1 | 4/2013 | Millmore et al. |
| 2013/0117444 A1 | 5/2013 | Sharma et al. |
| 2013/0253904 A1 | 9/2013 | Heller et al. |
| 2013/0332506 A1 | 12/2013 | Ewe et al. |
| 2014/0082511 A1* | 3/2014 | Weissberg ............... G06F 9/452 715/740 |
| 2014/0164497 A1 | 6/2014 | Chalana et al. |
| 2015/0201044 A1 | 7/2015 | Ewe et al. |
| 2015/0304458 A1 | 10/2015 | Ewe et al. |
| 2016/0112530 A1 | 4/2016 | Ewe et al. |
| 2016/0352853 A1 | 12/2016 | Ewe et al. |

FOREIGN PATENT DOCUMENTS

| | | |
|---|---|---|
| WO | 2008031625 A2 | 3/2008 |
| WO | 2010048274 A2 | 4/2010 |
| WO | 2010113160 A1 | 10/2010 |

OTHER PUBLICATIONS

Communication pursuant to Article 94(3) EPC dated May 31, 2017 for related European Patent Application No. 13822813.5, in 10 pages.
Communication pursuant to Article 94(3) EPC dated Oct. 31, 2017 for related European Patent Application No. 13822813.5, in 6 pages.
Extended European Search Report received in European patent applicatoin No. 13822813.5 dated Feb. 29, 2016, 11 pages.
GuiXT Designer Configuartion Guide, GuiXT.RTM. by Synactive, 2009, Synactive, Inc. Foster City, CA, 13 pages.
GuiXT Designer Installation Guide, GuiXT.RTM. by Synactive, 2009, Synactive, Inc. Foster City, CA, 17 pages.
International Search Report based on Intl. App. No. PCT/US2013/052403 dated Oct. 31, 2013.

* cited by examiner

DYNAMIC EXECUTION ENVIRONMENT IN NETWORK COMMUNICATIONS

RELATED APPLICATION

The present application is a continuation of U.S. patent application Ser. No. 15/081,674, filed Mar. 25, 2016, entitled "DYNAMIC EXECUTION ENVIRONMENT IN NETWORK COMMUNICATIONS" which is a continuation of U.S. patent application Ser. No. 13/560,204, now U.S. Pat. No. 9,300,745, issued on Mar. 29, 2016, and entitled "DYNAMIC EXECUTION ENVIRONMENT IN NETWORK COMMUNICATIONS," both are incorporated herein by reference in their entirety.

FIELD OF THE INVENTION

The present disclosure generally relates to network-based computer interactions and, more particularly, to a method and apparatus for providing a dynamic execution environment in network communications between client and server applications and/or systems.

DESCRIPTION OF THE RELATED ART

The ubiquitous nature of computer network access has ushered in a new age of interactivity. More and more applications are moving to a client/server model, where a local device contains a client for far more complex software executing on a remote system. As such, interface technology is advancing quickly to accommodate this paradigm shift.

However, such interfaces are typically static and tightly coupled to the specific application for which they are designed. It is typically not possible to customize or modify such an interface unless the application provides specific tools to do so. As such, data for these user interfaces is generally transported between the client and the server in some fixed format. Common formats for such data transmission include open standards such as Hypertext Markup Language (HTML) and proprietary formats as in business management suites such as SAP.

The client software typically interprets the data and renders the screen accordingly. User interface fields are displayed and navigation of the user interface is limited to what is provided by the server. However, in many situations it is desirable to make modifications to the user interface, such as for usability, personal preference, or to cater to different types of viewing devices. Such modifications necessitate changing both the layout and screen logic as experienced by the user, without modification of the client or server. Known solutions to the problem of altering the data flow between the client and the server involve complicated programming.

Therefore, there is a need in the art for a system and method to implement a dynamic execution environment in network communications between a client and server application and/or module such that data between the client and server are intercepted and modified on the fly and sent to their destinations seamlessly.

SUMMARY OF THE INVENTION

In some embodiments, a computer-implemented method is provided for providing a dynamic execution environment. The method comprises receiving a base user interface from a server, creating and storing one or more intermediate representations (IRs) which represent a mapping between the base user interface and a modified user interface, executing the one or more IRs to intercept network communication from the server, map between the base user interface and the modified user interface, and to send the modified user interface to one or more clients, and executing the one or more IRs to intercept network communication from the one or more clients to the server with user data, map between the modified user interface and the base user interface, and send the base user interface and the user data to the server.

In some embodiments, the method comprises a computer-implemented method for providing an event-trapping mechanism in a dynamic execution environment. The method comprises creating one or more execution blocks from a function stored in a script, wherein each of the one or more execution blocks is associated with a sequence of screen events of a user interface, storing the one or more execution blocks as handlers, and executing at least one of the one or more handlers independently from the others, when the associated sequence of screen events for the handler is detected in network traffic.

In some embodiments, there is an apparatus for providing a dynamic execution environment comprising an execution environment for receiving a base user interface, an intermediate representation module (IRM) coupled to the execution environment for creating one or more intermediate representations mapping between the base user interface and a modified user interface, and an event trapping mechanism for intercepting network communication between a server and one or more clients, executing one or more event handlers associated with a modification in the modified user interface, and communicating with the intermediate representation module to perform mappings between the modified user interface and the base user interface.

BRIEF DESCRIPTION OF THE DRAWINGS

The details of embodiments of the present invention, as to their structure and operation, may be gleaned in part by study of the accompanying figures, in which like reference numerals refer to like parts, and in which.

DETAILED DESCRIPTION

Embodiments of the present invention relate to a computer-implemented method for providing a dynamic execution environment. In an exemplary embodiment, the present invention provides for making modifications to a base user interface for a client device to make the user interface easier to use, more compact, or more appropriate to a client need. In an embodiment, only those clients which require the simplified view will see them, whereas other clients will view the original base user interface or a different modification thereof. The dynamic execution environment uses scripting languages as a means to modify the base user interface on the fly, such that the client is unaware of any modification. The backend server (a SAP database, application server, and the like) is also unaware of any modification, and operates as if the client is using the base user interface.

Figure 1:
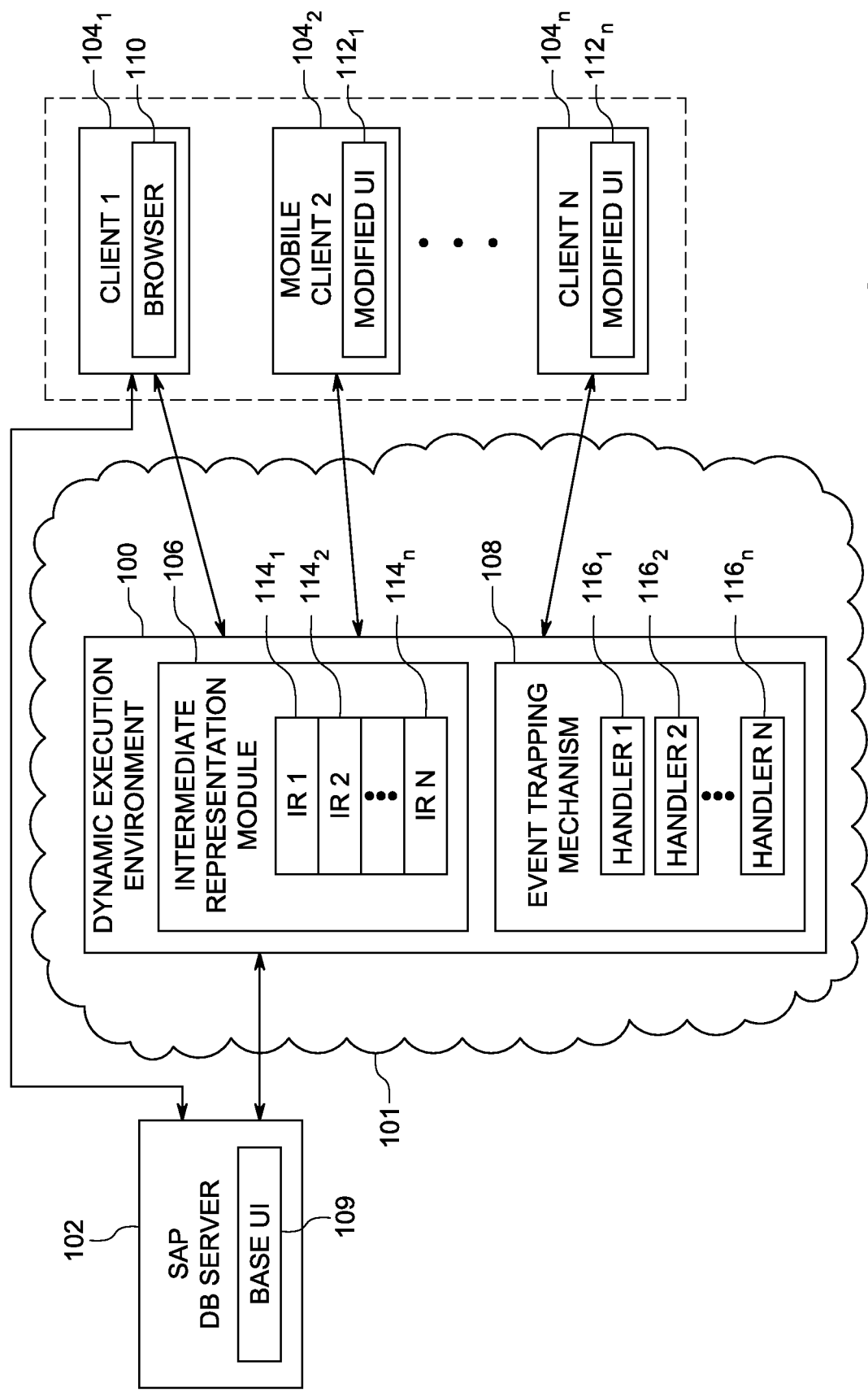
FIG. 1 depicts a functional diagram of an overview of the functionality of the dynamic execution environment, according to an embodiment.

FIG. 1 depicts a functional diagram of an overview of the functionality of the dynamic execution environment, according to an embodiment. A dynamic execution environment 100 sits on a network 101. In an exemplary embodiment, the dynamic execution environment 100 intercepts communications, for example, between a SAP database server 102 and one or more clients $104_{1 \ldots n}$. One of ordinary skill in the art will recognize that the server 102 can be any type of server, including, but not limited to, an application server, a web server, a database server, and the like. The dynamic execution environment 100 comprises an intermediate representation module 106 and an event trapping mechanism 108. The intermediate representation module 106 further comprises one or more intermediate representations $114_{1 \ldots n}$. The event trapping mechanism 108 comprises one or more handlers $116_{1 \ldots n}$. The server 102 outputs a base user interface 109, which is directly sent through the network 101 to the client $104_1$. The client $104_1$ views the base user interface 109 in a browser 110. Alternatively, there are clients $104_{2 \ldots n}$ which are unable to view the base user interface 109 in a browser without difficulty, or it may be more convenient or useful to view the base user interface 109 in a different form as a modified user interface $112_{1 \ldots n}$. Here, it is possible to have several different classes of clients who have differing modified user interfaces $112_{1 \ldots n}$, with unique intermediate representations $114_{1 \ldots n}$ and handlers $116_{1 \ldots n}$ associated with the clients.

When the clients $104_{2 \ldots n}$ try to interact with the SAP Database server 109, the dynamic execution environment 100 intercepts the communications by filtering network traffic in between the server 102 and the clients $104_{2 \ldots n}$. When the dynamic execution environment 100 intercepts a request from client $104_2$ for example, the dynamic execution environment 100 fetches a base user interface 109 from the SAP database server 102. The dynamic execution environment 100 then executes its intermediate representation module to modify the base user interface 109 and produce a modified user interface $112_1$ to send to client $104_2$.

Figure 2:
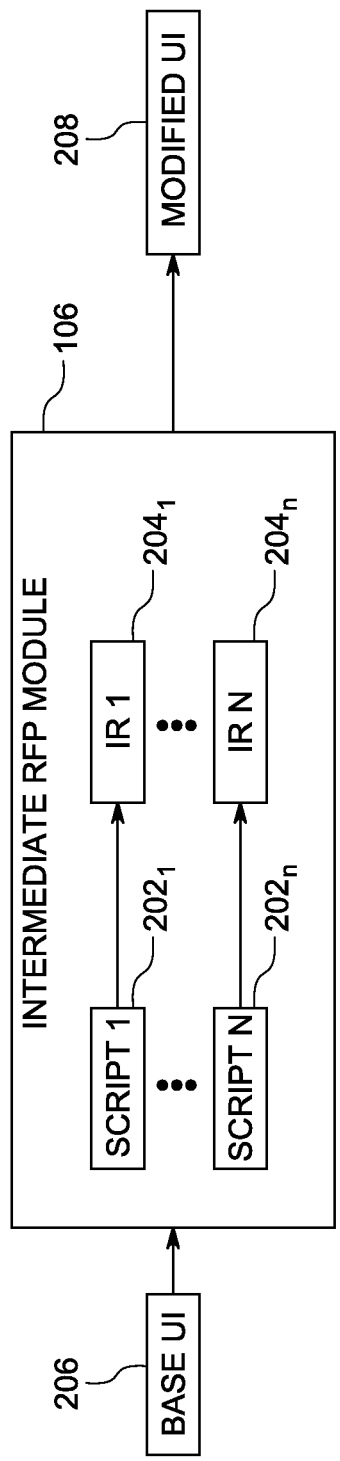
FIG. 2 depicts a functional diagram of an overview of an intermediate representation module, according to an embodiment.

FIG. 2 depicts a functional diagram of an overview of the intermediate representation module 106 from FIG. 1, according to an embodiment. The diagram shows the process of converting a base user interface 206 to a modified user interface 208. The intermediate representation module 106 contains one or more scripts $202_{1 \ldots n}$ configured, for example, by an administrator of the network 101 or the dynamic execution environment 100. These scripts $202_{1 \ldots n}$ are read by the intermediate representation module and converted into intermediate representations $204_{1 \ldots n}$. These intermediate representations $204_{1 \ldots n}$ each represent at least one modification to the base user interface 206. For example, the modification may include moving a user input box from one location to another, as discussed below with regards to FIG. 5. All of these modifications together operate on the base user interface 206 to generate a modified user interface 208. The mapping between the base user interface 206 and the modified user interface 208 also operate in reverse fashion, such that the modified user interface 208 may be subjected to the intermediate representations $204_{1 \ldots n}$, to be converted back to the base user interface 206.

An example of a script $202_1$ follows:

```
if(__transaction == "MM02") {
    if(Z__SHOW__GUIXT == 1) {
        title('Change Material Attributes');
        pushbutton("[TOOLBAR]", "Show Standard SAP",
{"process":do__scrn__toggle, "using":{"|__set":"0"}});
        pushbutton("[TOOLBAR]", 'Start Over', {"process":mm02__reset});
            //Deletion of Toolbar Pushbutton not supported v1.1.39.2
        del("P[Select view(s)]");
        del("P[Organizational levels]");
        del("P[Data]");
        text([1,38], '&V[z__mm02__mat__desc]', {"size":39, "border":true});
        del("F[Change Number]");
        box([2,0], [21,49], 'Sales Org: 1000');
        text([3,1], 'Dist. Channel', {"size":13, "border":true});
            comment([4,4], '10', {"size":3});
        inputfield([4,16], 'Price Book Print Restrictions', [4,46], {"size":3,
"name":"z__mm02__pricebook__restr__1000", "searchhelp":"H__TVM1"});
        comment([5,4], '10', {"size":3});
        checkbox([5,16], 'Product Attribute 1',
{"name":"z__mm02__small__rtl__book__print__1000"});
```

This script snippet shows, for example, that certain sections—such as "Select Views", "Organizational Data", and the like—are deleted by the intermediate representation module 106 to create the modified user interface 208. The modified user interface 208 is then sent to the client $104_2$. In some instances, text boxes are moved and check-boxes renamed, as additional examples of the types of modifications that are scripted for the base user interface 206. The above script represents an example of an intermediate representation used to convert a base user interface 206 into a modified user interface 208.

Figure 3:
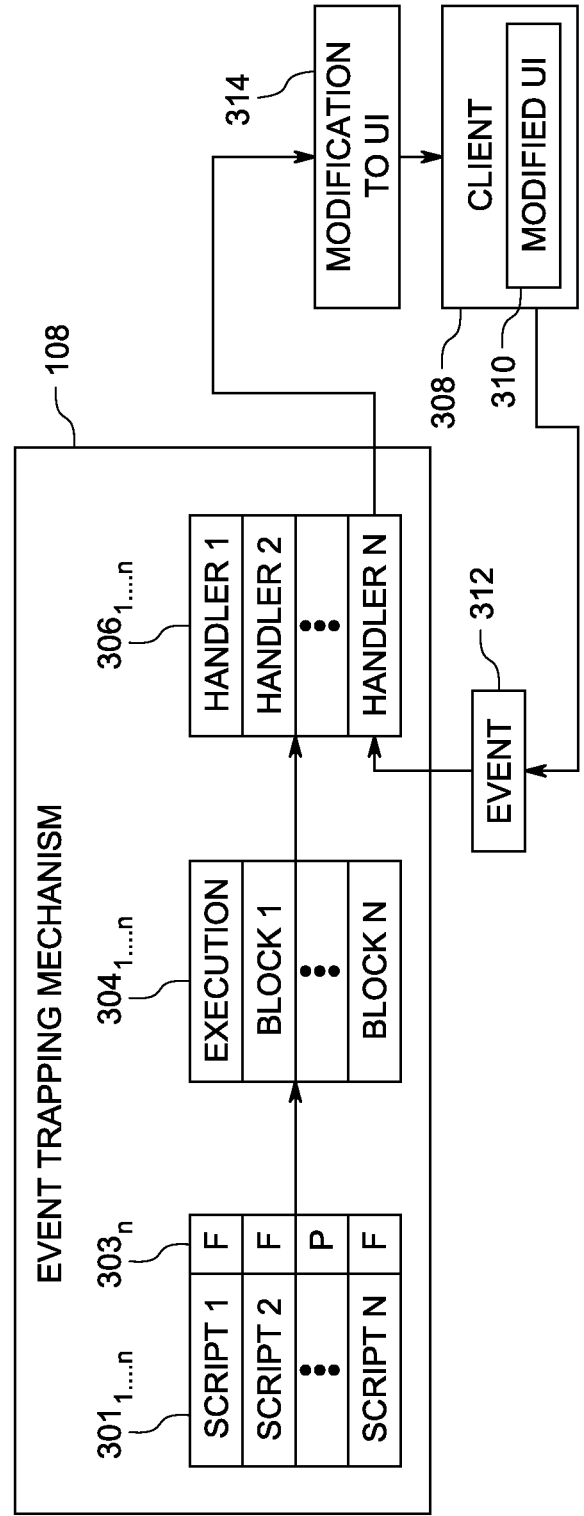
FIG. 3 depicts a functional diagram of an overview of an event trapping mechanism, according to an embodiment.

FIG. 3 depicts a functional diagram of an overview of the event trapping mechanism 108 of FIG. 1, according to an embodiment. The event trapping mechanism 108 consists of one or more scripts $301_{1 \ldots n}$. In an embodiment, the scripts are implemented in the JavaScript language. However, one of ordinary skill in the art will recognize that any scripting or programming language may be used, including, but not limited to, Java, Ruby, Python, and the like. The event trapping mechanism 108 reads the scripts $301_{1...n}$ and extracts execution blocks $304_{1...n}$ from script functions $303_n$. The execution blocks $304_{1...n}$ are then converted into event handlers $306_{1...n}$. These event handlers $306_{1...n}$ trap events produced by a screen associated with events from a modified user interface 310.

For example, there is a client 308, currently viewing the modified user interface 310, as produced by the intermediate representation module 106 in the dynamic execution environment 100. The modified user interface 310 produces events such as "enter" or "F2", mouse clicks, keyboard key presses, cursor movements, touchpad presses, voice input, other user interactions, and the like. These events will be trapped in a special system array of associated keys, called onUIEvents. For example, this sequence will disable function key F12 onUIEvents['/12']={'[process':disable}; One of ordinary skill in the art will recognize that the present invention does not limit the types of events a user interface produces. The produced event 312 has an associated handler $306_n$ in the event trapping mechanism 108 which traps the event and responds accordingly. In one exemplary embodiment, the handler $306_n$ traps the event, creates a modification to the user interface 314, and sends that modification back to the client 308. Thus the modified user interface 310 is further modified according to the handler $306_n$.

According to an embodiment, the execution blocks $304_{1...n}$ from which handlers $306_n$ are extracted, are sequentially presented in the scripts $301_{1...n}$, but these handlers are no longer associated with sequential execution according to normal program function. The event trapping mechanism converts the handlers to operate asynchronously, i.e., on demand, as opposed to according to their sequential order in scripts $301_{1...n}$.

Figure 4:
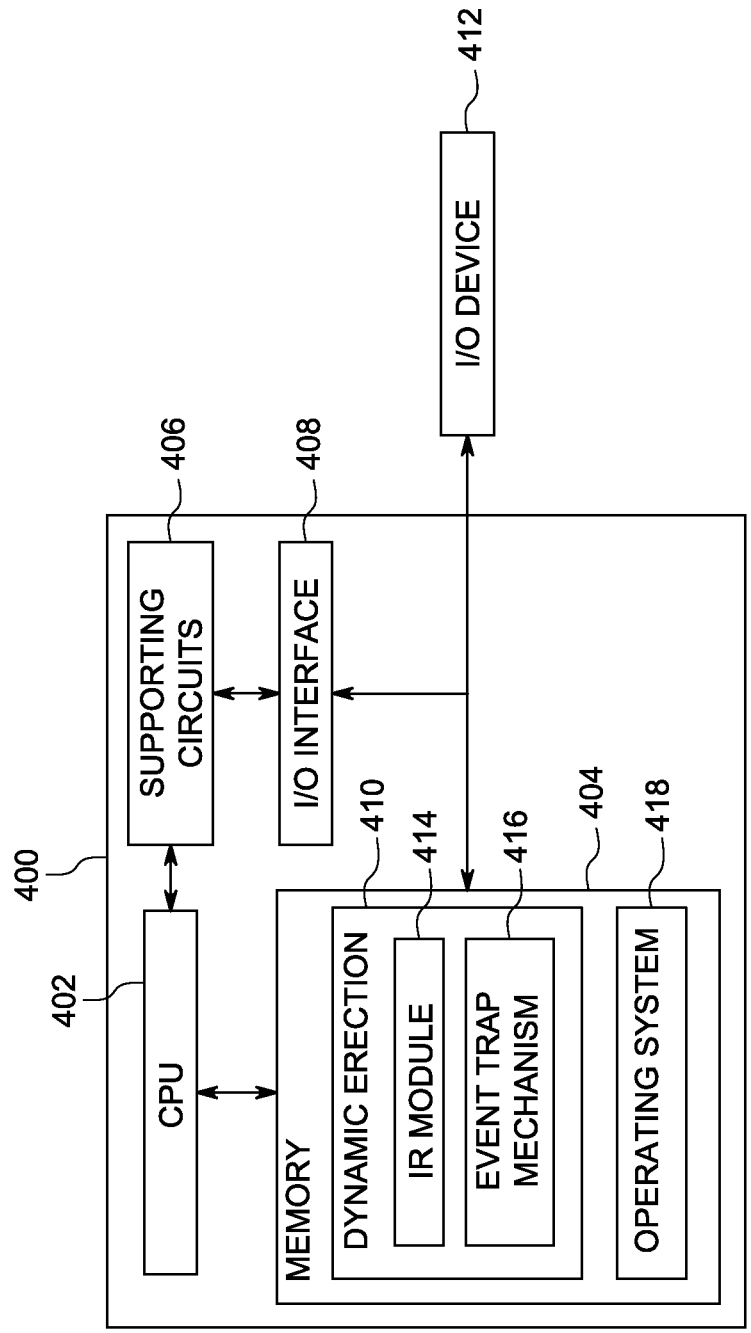
FIG. 4 depicts a block diagram of a computer system which may be utilized in accordance with an embodiment.

FIG. 4 is a block diagram depicting an embodiment of a computer system 400 providing a program interface, according to an embodiment. The computer is a computing device such as those generally known in the art. Such devices include desktop personal computers, laptops, smart-phones, personal digital assistants, and the like. The computer 400 includes a central processing unit (CPU) 402, memory 404 and support circuits 406. The CPU 102 comprises one or more commercially available microprocessors or microcontrollers that facilitate data processing and storage. The various support circuits 106 are utilized to facilitate the operation of the CPU 104 and include such circuits as clock circuits, power supplies, cache, input/output circuits, network devices, and the like.

The memory 404 comprises random access memory, read only memory, removable storage, flash memory, optical disk storage, disk drive storage, and combinations thereof. The support circuits 406 are coupled to an I/O interface 408, which in turn is connected to various I/O devices 412, including, but not limited to, mice, keyboards, displays, and the like. The memory 404 stores an implementation of the dynamic execution environment 100 in FIG. 1 as a module 410, and the memory also stores an operating system 418. In operation, the CPU 402 executes the operating system 418 to control the general utilization and functionality of the computer 400. The dynamic execution environment 410 comprises an intermediate representation module 414 and an event trapping mechanism 416. The execution environment 410 allows for performing various operations and modifications of a received base user interface 109 from FIG. 1 to produce a modified user interface $112_{1...n}$. Examples of such modifications comprise at least drag-and-drop movement operations, deletions, additions, changing strings, moving a cursor, and the like. One of ordinary skill in the art will recognize that additional modifications, not mentioned, can also be implemented.

Figure 5:
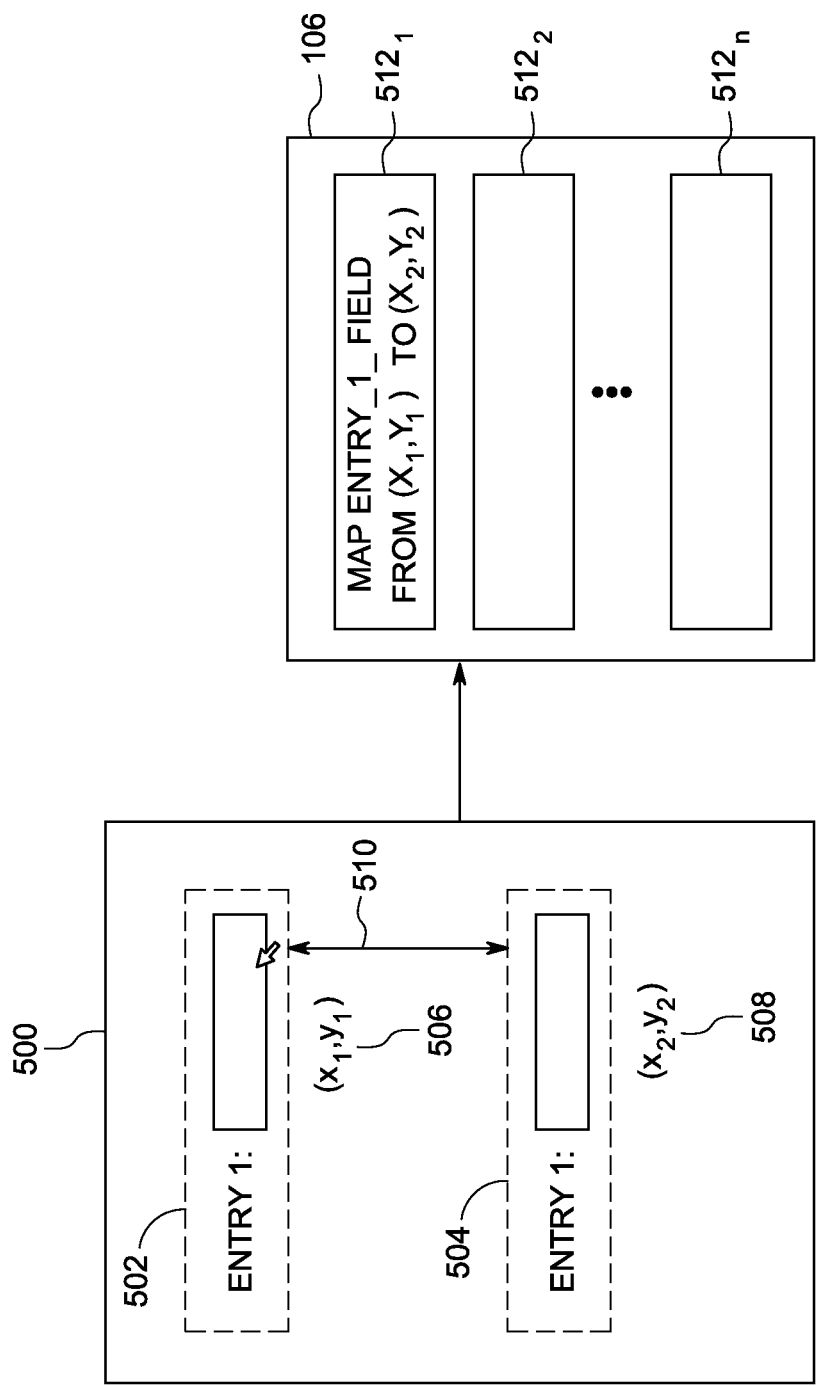
FIG. 5 depicts a functional diagram of the creation of an intermediate representation, according to an embodiment.

FIG. 5 is a functional diagram depicting the generation of a set of intermediate representations $114_{1...n}$ from a base user interface 500, within the intermediate representation module 106. The base user interface 500 comprises a data entry control 502. For simplicity, the exemplary data entry control 502 is depicted as both a label and a data entry text box. In the base interface, the data entry control 502 is located at a particular set of screen coordinates 506, $(X_1, Y_1)$. A modification 510 is performed on the data entry control 502. In this particular example, the modification 510 is a drag-and-drop operation to move the data entry control 502 to another location on the display screen. The modified data entry control 504 represents the new location of the data entry control 502. The modified data entry control 504 is located at a second set of screen coordinates 508, $(X_2, Y_2)$.

The act of modifying the base user interface 500 causes the generation of one or more intermediate representations stored in intermediate representation module 106. While in the present example the movement of a control generates the intermediate representations, one of ordinary skill in the art will realize that the generation of the intermediate representations could occur as a result of the execution of a particular command, such as a "save" command. Such an operation allows for multiple intermediate representations for multiple controls to be stored in intermediate representation module 106 at once. The intermediate representations are comprised of one or more scripts $512_{1...n}$. The scripts $512_{1...n}$ are later used to perform mapping operations between the modified user interfaces $112_{1...n}$ and the base user interface 109.

In the present example, the script $512_1$ is newly generated in response to the operation 510 performed on the data entry control 502. The script $512_1$ states that the data entry 1 field (data entry control 502) located at $(X_1, Y_1)$ maps to the modified data entry control at $(X_2, Y_2)$. In this manner, the scripts $512_{1...n}$ track and map modifications from the base user interface 109 to the modified user interface $112_{1...n}$. In some embodiments, the scripts 512 track the relationship between particular controls of the base user interface 109 and the modified user interface 112, such as performing a direct mapping from a first control to a second control. In some embodiments, the scripts 512 perform the mapping between particular screen locations, such as by moving any data input at a point A on the modified user interface 112 to a point B on the base user interface 109. The scripts 512 may then be used to modify any outgoing data generated by the modified user interface 112 to ensure a common data format with a remote device expecting data to be transmitted by the base user interface.

Figure 6:
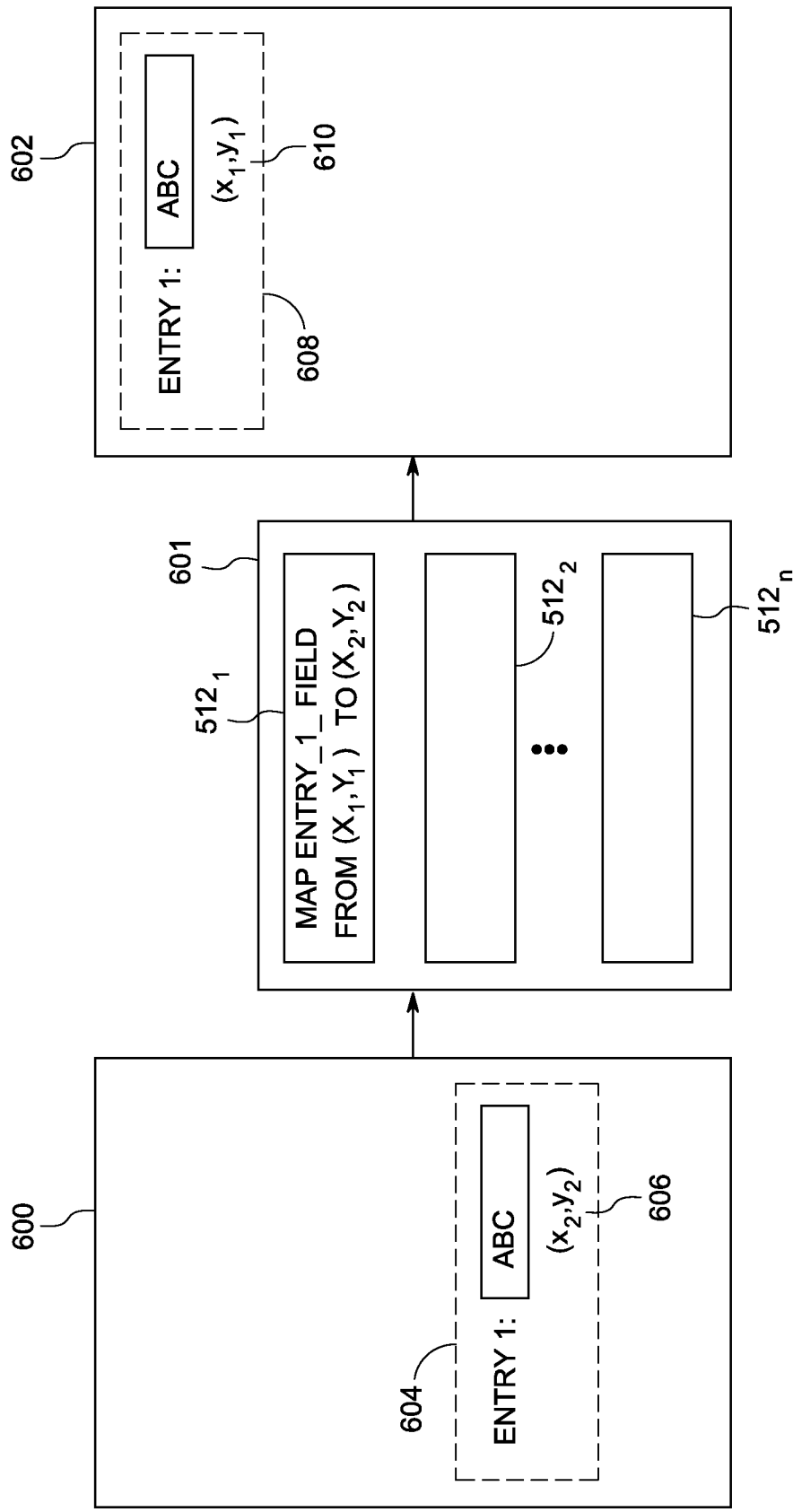
FIG. 6 depicts a functional diagram of the use of an intermediate representation to perform input operations from an internal source, according to an embodiment.

FIG. 6 is a functional diagram depicting an input operation from an external source, as in the event trapping mechanism 108 in FIG. 1, according to an embodiment. Functional elements of the figure include a modified user interface 600, a set of intermediate representations 601, and a base user interface 602. In some embodiments, the input is received via the event trapping mechanism 108 as discussed with respect to FIG. 1. In the present exemplary embodiment, the user has input a data value of "ABC" into the modified data entry control 604. Upon detection of the input value, the intermediate representations 601 perform a mapping on the outgoing data to change the screen location of the "ABC" input from the modified coordinates 606 $(X_2, Y_2)$ to the base coordinates 610 $(X_1, Y_1)$. As such, the data input ABC appears in the format of the base user interface 602 as expected by the device for which the data input is intended, even though the data was input into a modified data entry control 604 in a modified user interface 600. This is controlled by the event trapping mechanism 108 discussed above, where a handler is stored for base user interface 602 that controls the mapping of data entry control 608 between the base user interface 602 and the modified user interface 600. The event trapping mechanism 108 maps the execution blocks $304_1 \ldots _n$ for a screen and the event to handlers $306_1 \ldots _n$ in the intermediate representation 601. When a user modifies data entry control 604, the handler associated with that event, which is stored in the intermediate representation 601, is executed, mapping the data entry control 604 to data entry control 608. Accordingly, the server storing the base user interface 602 is unaware that any modification has taken place.

Figure 7:
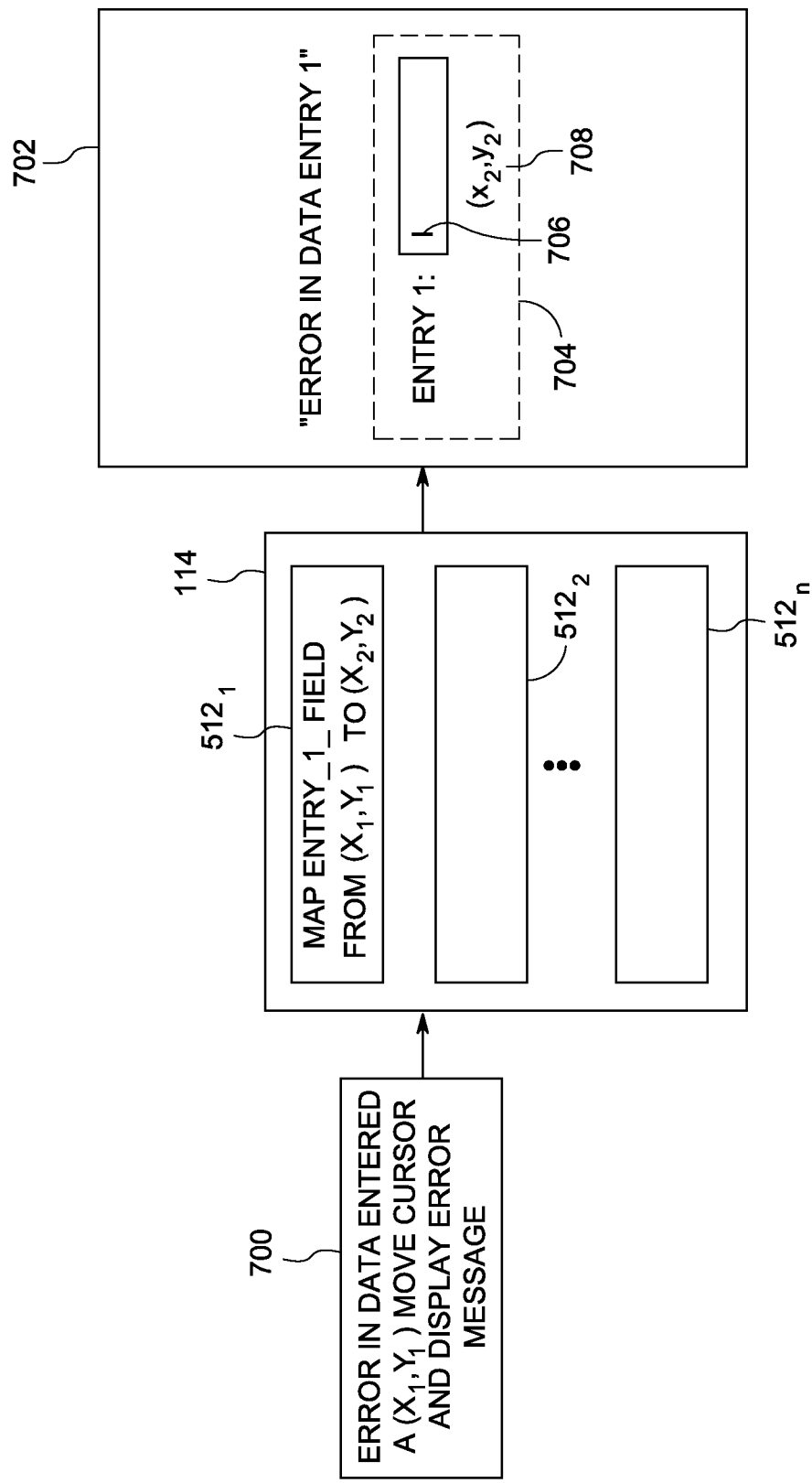
FIG. 7 depicts a functional diagram of the use of an intermediate representation to perform input operations from an external source, according to an embodiment.

FIG. 7 is a functional diagram depicting an input operation from an external source, as executed by the intermediate representation module 106 in FIG. 1, according to an embodiment. Functional elements of the figure include an external input 700, a set of intermediate representations 114, and a modified user interface 702. In the present exemplary embodiment, the external input 700 is an error message, such as that received from a server. The external input 700 indicates that the interface should display an error message and move the cursor to the entry control where the erroneous input occurred. The external input 700 is interpreted by the intermediate representations 114. In particular, the script $512_1$, which governs the modified data entry control 704, acts on the external input 700. The script $512_1$ modifies the cursor placement operation so that instead of occurring at the coordinates of the control in the base user interface, $(X_1, Y_1)$, the cursor placement operation occurs at the site of the modified control 704 at coordinates $(X_2, Y_2)$ 708 in the modified interface 702. The cursor 706 is then placed within the modified data entry control 704 in accordance with the external input.

Figure 8:
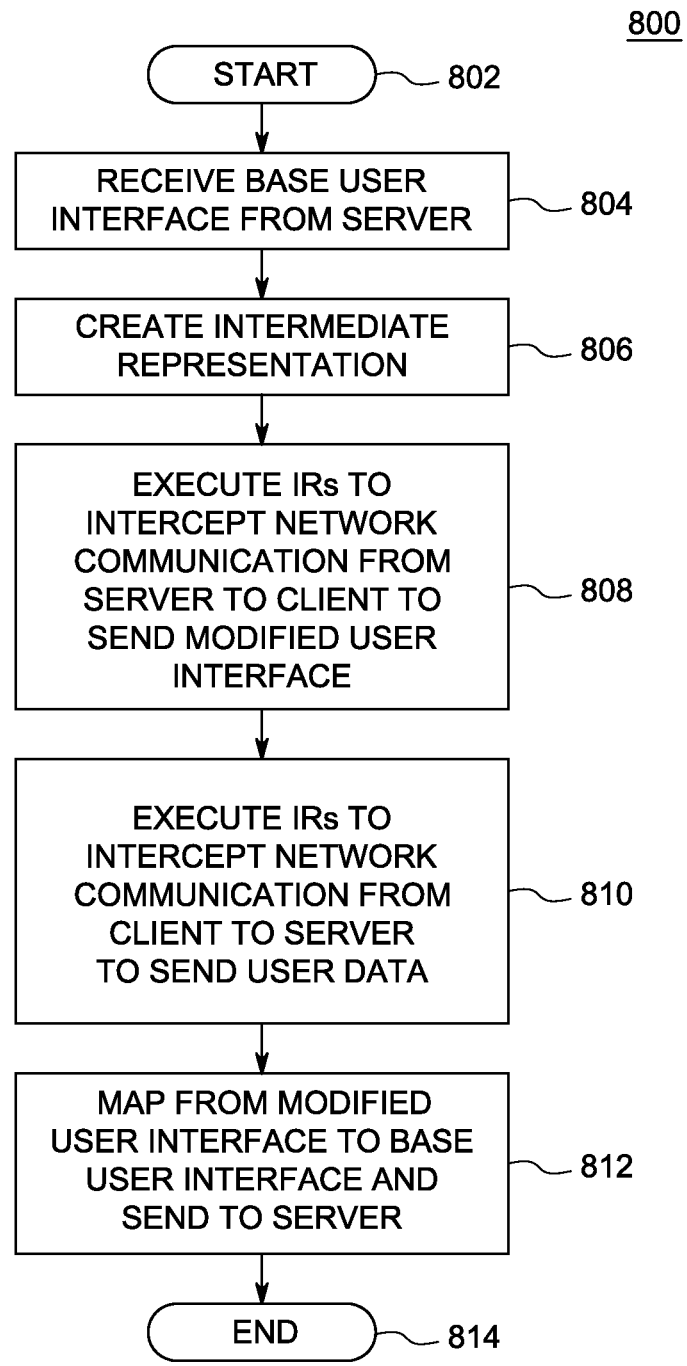
FIG. 8 depicts a flow diagram for providing a dynamic execution environment, according to an embodiment.

FIG. 8 is a flow diagram depicting operation of the dynamic execution environment 100 in FIG. 1 and element 410 in the computer 400 in FIG. 4. The method begins at step 802 and proceeds to step 804. At step 804, a base user interface is received from the server. At step 806, one or more intermediate representations are created for mapping between the base user interface and a modified user interface. These intermediate representations, discussed above, are formed by custom scripts to control the UI controls in the modified user interface as well as to control UI behavior. At step 808, in response to a client attempt to connect to a server to retrieve the base user interface, the intermediate representation module intercepts the network communication between the server and the client and sends the client the modified user interface. A user will be viewing a modified user interface according to the intermediate representation scripts. The user then modifies data in the controls and submits the data using the modified user interface. Once the client sends the modified user interface to the server with user data, the intermediate representation module once again intercepts the network communication between the client and the server at step 810. Execution then proceeds to step 812, where the modified user interface and the user data are mapped to the base user interface and the base user interface, including the user data, is provided to the server. The method 800 ends at step 814.

Figure 9:
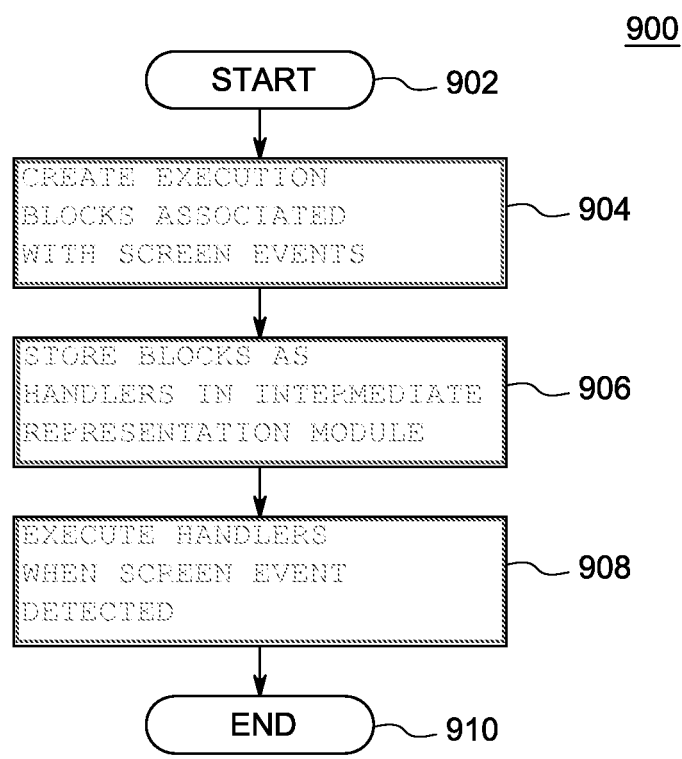
FIG. 9 depicts a flow diagram for providing an event trapping mechanism in a dynamic execution environment, according to an embodiment.

FIG. 9 is a flow diagram of a computer-implemented method 900 for providing the event-trapping mechanism 416 in a dynamic execution environment 410 in the computer 400. The method 900 starts at step 902 and proceeds to step 904. At step 904, the method creates execution blocks from functions stored in a script. In an embodiment, the script is in JavaScript, although, as discussed above, other scripting languages may be used. The function definition is extended to include multiple entry points. The screen event trapping mechanism uses the multiple entry points to delineate and create execution blocks. Each execution block is associated with a sequence of screen events in a user interface, and the position of the block in the code indicates the block's execution sequence. At step 906, each execution block is stored as a handler in the intermediate representation module, such that it is available for execution at the time when the associated screen appears. The execution blocks provide a sequence of screen events associated with a user's flow of using the application. In this manner, a screen can be made optional by creating a handler for it and automating it away by a particular keystroke. Once a block is executed, it will not be executed again, and correspondingly blocks of the same screen can appear more than once to indicate the order of the sequence of screens as they appear from the server. Accordingly, the method then proceeds to step 908 where a handler is executed when its associated sequence of screen events is detected. The method ends at step 910.

The following code snippet is an example of a script that a UI event trapping mechanism may use to create handlers for UI events:

```
onUIEvents["/3"]={"process":disable};
onUIEvents["/15"]={"process":disable};
    The following an example of code that is used for creating execution blocks, for
the handling of screen events. This script is an extension to standard Javascript.
    function mm02_on_enter( ) {
        set("V[vdx]", '1'); //Counter for Sales Org.
        set("V[z_mm02_mat_no]", '&F[Material]');
        enter('/nmm03');
        onscreen 'SAPLMGMM.0060'
        NXT_SORG:
        set("F[Material]", '&V[z_mm02_mat_no]');
        enter('/5');
        onscreen 'SAPLMGMM.4000'
        set("V[z_mm02_mat_desc]", '&F[MAKT-MAKTX]');
        set("V[z_mm02_restr_code_&V[idx]_&V[vdx]000]", "&F[Material group 1]");
        set("V[z_test3]", '&F[Material group 1]');
        if(idx == 10) {
            set("V[z_mm02_pricebook_restr_&V[vdx]000]", '&F[Pricebook restriction]');
            set("V[z_mm02_small_rtl_book_print_&V[vdx]000]", '&C[Product attribute
```

-continued

```
1]');
        set("V[z_test4]", '&C[Product attribute 1]');
    }
}
```

In the above snippet of JavaScript code, execution blocks are extracted from the function mm_02_on_enter( ). There are several blocks of code in this function. For example, one block begins with the label "onscreen 'SAPLMGMM.0060'." This represents one of the execution blocks that will be used to create a handler, such that, in an exemplary embodiment, instead of entering into the function at the first line of the function, the event trigger will cause the function to begin executing on the line immediately following "onscreen 'SAPLMGMM.0060'" until the next onscreen block command is encountered. A similar execution is seen as being defined on the line "onscreen 'SAPLMGMM.4000'." The "onscreen" identifier represents an event on the modified user interface. In this instance, onscreen 'SAPLMGMM.4000' indicates when a page with an ID of SAPLMGMM gets invoked. Then, the set("V[z_mm02_pricebook_restr_&V[vdx]000]", '&F[Pricebook restriction]') is called, such that the z_mm02_pricebook_restr_&V[vdx]000] element of the base user interface is set to '&F[Pricebook restriction]', in addition to other modifications in the base user interface.

In an exemplary embodiment of the present invention, the screen event trapping mechanism functions as an extension to standard JavaScript, expanding the functionality available in JavaScript and allowing it to handle execution blocks and the like. Also, since the sequence of screen events is coded in the same JavaScript function, local variable definitions can be used across handlers and execution blocks. This enables different screens to share data seamlessly. In addition, screen sequences allow for events to be circumvented, or skipped around using "goto" functionality as implemented in the extension. In other exemplary embodiments, extensions are made available to different programming languages, including, but not limited to, Ruby, PHP, Python, ASP.NET and the like, to provide for the implementation of a screenevent trapping mechanisms as described above.

Embodiments of the present invention are directed towards modifications of a user interface for a business enterprise client as described in commonly assigned U.S. Provisional Patent Application No. 61/342,372, entitled "Method and Apparatus for Accessing an Enterprise Resource Planning System via a Mobile Device" and filed Apr. 13, 2010, U.S. Provisional Patent Application No. 61/116,573, entitled "System and Method for Improved SAP Communications" and filed Nov. 20, 2008, U.S. patent application Ser. No. 12/623,156, entitled "System and Method for Improved SAP Communications" and filed Nov. 20, 2009, U.S. patent application Ser. No. 13/425,101, entitled "System and Method for Improved SAP Communications" and filed Mar. 20, 2012, and U.S. patent application Ser. No. 13/425,125, entitled "System and Method for Improved SAP Communications" and filed Mar. 20, 2012, all of which are incorporated herein by reference. In some embodiments, the interface of a mobile device is modified to provide for full functionality of the business enterprise client, while allowing modification of the interface to accommodate the unique challenges of providing a mobile device interface.

Figure 10:
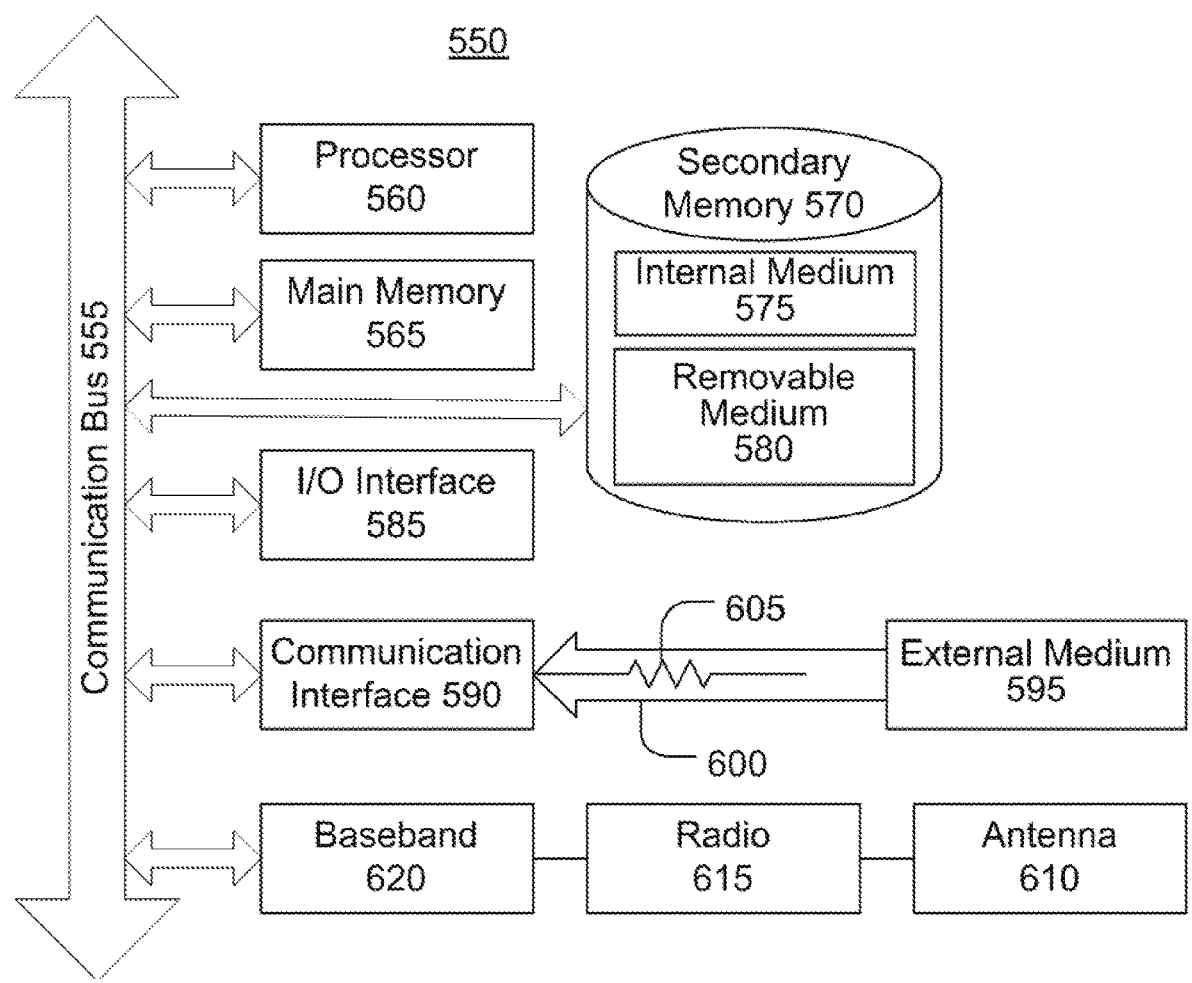
FIG. 10 is a block diagram illustrating an example wired or wireless system that may be used in connection with various embodiments described herein.

FIG. 10 is a block diagram illustrating an example wired or wireless system 550 that may be used in connection with various embodiments described herein. For example the system 550 may be used as or in conjunction with a dynamic execution environment as previously described with respect to FIGS. 1-9. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that were previously described with respect to FIGS. 1-4.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

What is claimed is:

1. A computer-implemented method for providing a dynamic execution environment, the method comprising, by at least one hardware processor:
   after receiving a request for a base user interface from a user device, receiving the base user interface from a server;
   processing the base user interface from the server to identify a screen of the base user interface;
   identifying an asynchronous event handler associated with the screen of the base user interface;
   creating one or more intermediate representations corresponding to the asynchronous event handler associated with the screen of the base user interface, wherein each of the one or more intermediate representations comprises one or more scripts that modify the base user interface to produce a modified user interface;
   executing the one or more intermediate representations corresponding to the asynchronous event handler associated with the screen of the base user interface to produce the modified user interface;
   in response to the request for the base user interface from the user device, sending the modified user interface to the user device instead of the base user interface requested by the user device; and,
   in response to each of one or more events within the modified user interface, using one or more asynchronous event handlers to execute at least one additional modification to the base user interface.

2. The method of claim 1, wherein at least one intermediate representation comprises one or more scripts that move at least one data entry control from a first position in the base user interface to a second position in the modified user interface.

3. The method of claim 2, wherein at least one intermediate representation comprises one or more scripts that modify a cursor placement, instructed by a message from the server, so as to correspond to the second position of the moved data entry control.

4. The method of claim 3, wherein the message from the server comprises an error message configured to identify invalid user data.

5. The method of claim 2, further comprising:
receiving user data from the user device via the data entry control at the second position in the modified user interface;
mapping the user data to the data entry control at the first position in the base user interface; and
sending the user data to the server in association with the data entry control at the first position in the base user interface.

6. The method of claim 1, wherein at least one intermediate representation comprises one or more scripts that delete at least one section of the base user interface to create the modified user interface.

7. The method of claim 1, wherein at least one intermediate representation comprises one or more scripts that change at least one label in the base user interface to create the modified user interface.

8. The method of claim 1, wherein at least one intermediate representation comprises one or more scripts that change a font in the base user interface to create the modified user interface.

9. The method of claim 1, wherein the one or more intermediate representations comprise a plurality of intermediate representations, which each have an order of operation with respect to the other ones of the plurality of intermediate representations.

10. The method of claim 1, further comprising creating the one or more asynchronous event handlers for each of a plurality of screen events in a sequence of screen events.

11. The method of claim 10, wherein the sequence of screen events comprises at least one of an on-screen event, an on-error event, an on-message event, or a document object model event.

12. The method of claim 1, wherein using the one or more asynchronous event handlers comprises entering a function in a script after a label in a middle of the function, instead of entering the function at a first line of the function.

13. The method of claim 12, wherein the label comprises a keyword and an identifier of a screen.

14. The method of claim 1, wherein at least one of the one or more events comprises a user interaction.

15. The method of claim 1, wherein at least one of the one or more events comprises a receipt of a screen.

16. The method of claim 15, wherein the one or more asynchronous event handlers comprise a plurality of sequential blocks in a function in a script, and wherein using the asynchronous event handlers comprises executing a next one of the plurality of sequential blocks, in sequence, upon each receipt of the screen.

17. A computer-implemented method for providing a dynamic execution environment, the method comprising, by at least one hardware processor:
after receiving a request for a base user interface from a user device, receiving the base user interface from a server;
processing the base user interface from the server to identify a plurality of screens of the base user interface;
identifying a first event handler associated with a first screen of the base user interface;
creating one or more first intermediate representations corresponding to the first event handler associated with the first screen of the base user interface, wherein each of the one or more first intermediate representations comprises one or more scripts that modify the first screen of the base user interface to produce a modified user interface;
executing the one or more first intermediate representations corresponding to the first event handler to produce the modified user interface;
in response to the request for the base user interface from the user device, sending the modified user interface to the user device instead of the base user interface requested by the user device;
identifying a second event handler associated with a second screen of the base user interface;
creating one or more second intermediate representations corresponding to the second event handler associated with the second screen of the base user interface, wherein each of the one or more second intermediate representations comprises one or more scripts that automatically send a response to the server;
executing the one or more second intermediate representations corresponding to the second event handler to automatically send the response to the server; and
in response to the request for the base user interface from the user device, eliminating the second screen of the base user interface from being sent to the user device.

18. The method of claim 17, wherein the response sent to the server is a simulated user interaction.

19. The method of claim 18, wherein the simulated user interaction is a keystroke.

* * * * *